Aug. 8, 1950    W. I. TATTLE    2,518,201
PUFF-FINISHING MACHINE
Filed Aug. 14, 1946    2 Sheets-Sheet 1
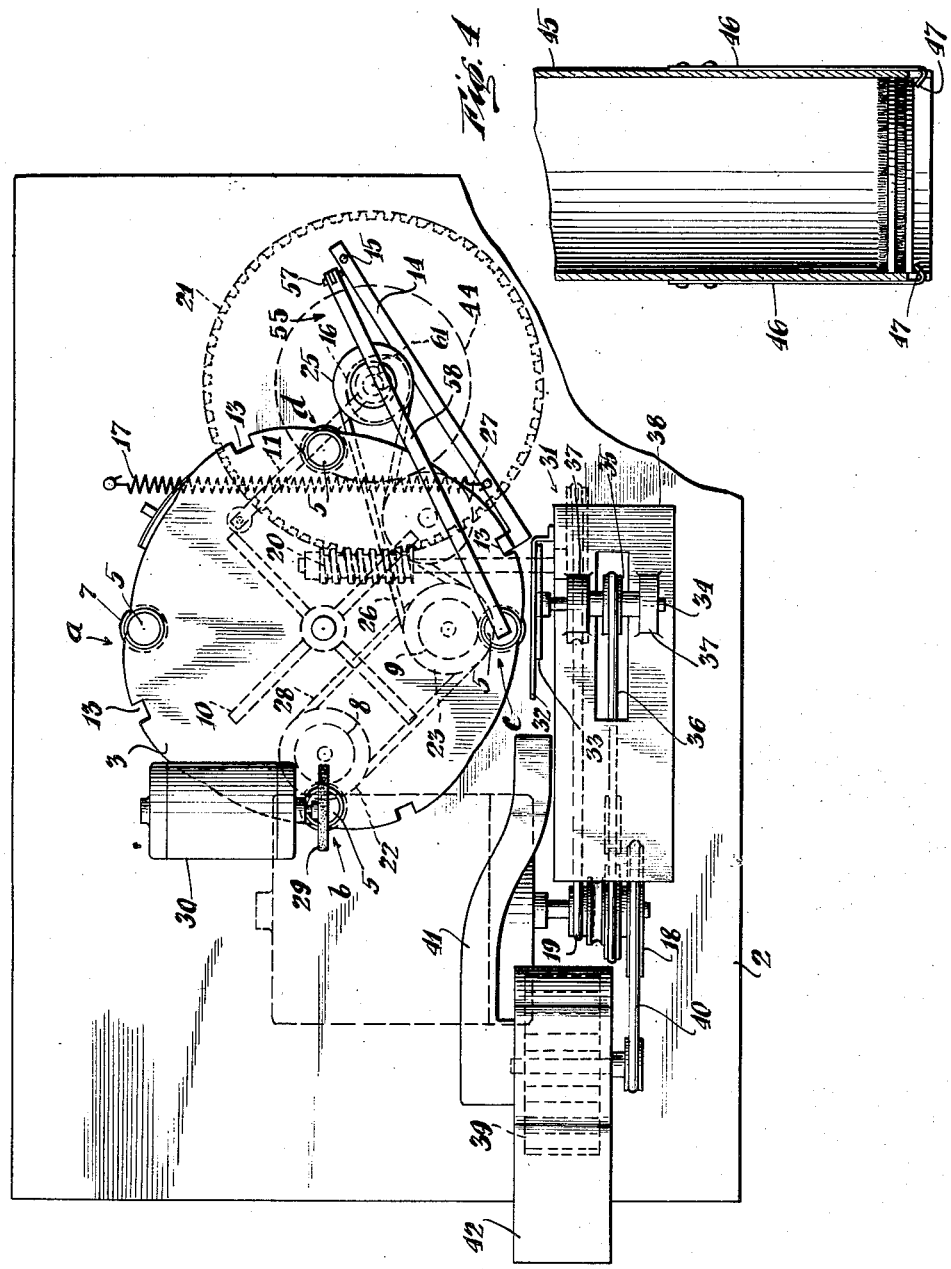
INVENTOR
William I. Tattle
BY
ATTORNEY Aug. 8, 1950  W. I. TATTLE  2,518,201
PUFF-FINISHING MACHINE
Filed Aug. 14, 1946  2 Sheets-Sheet 2
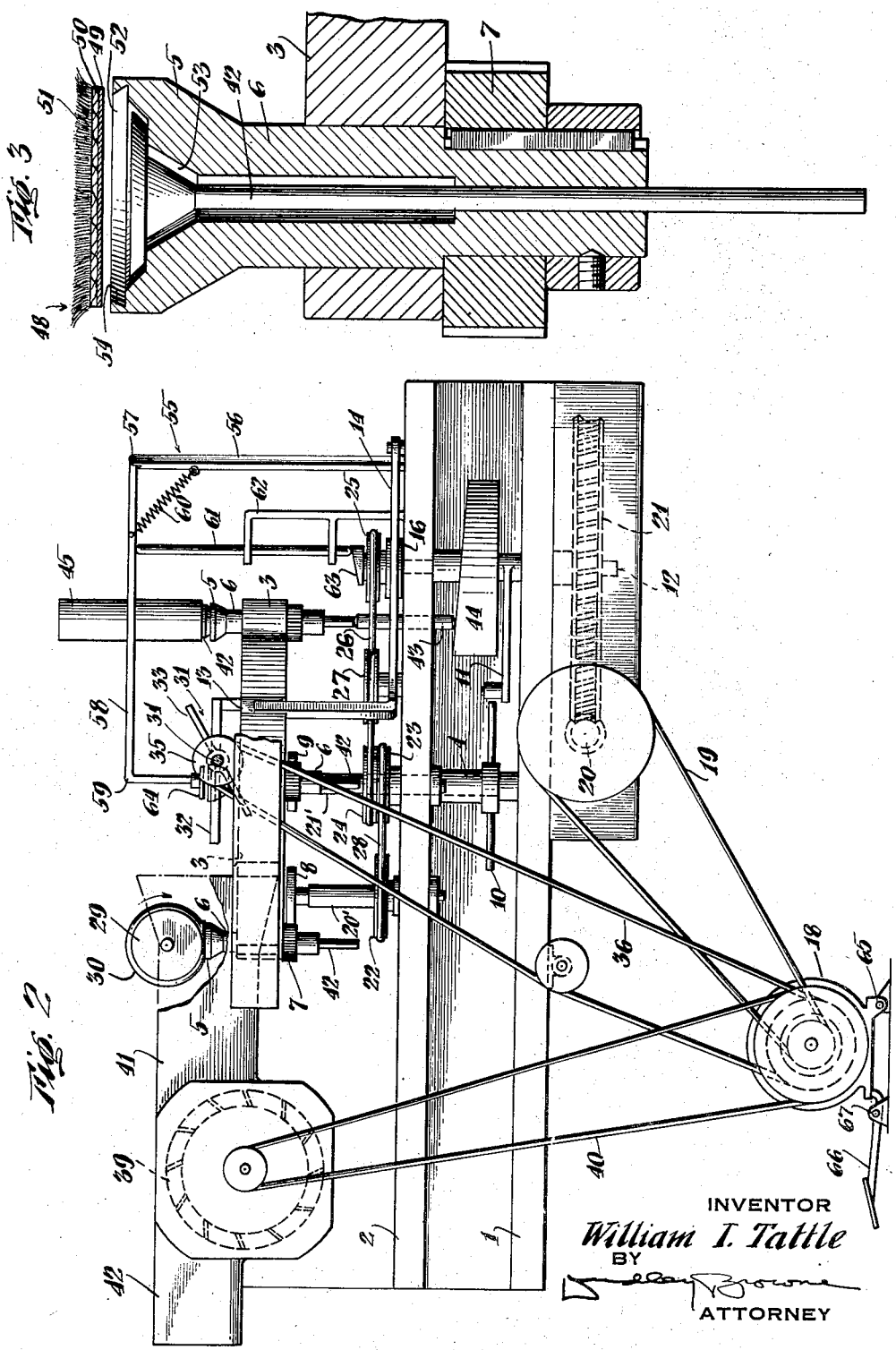
INVENTOR
William I. Tattle
BY
ATTORNEY Patented Aug. 8, 1950

2,518,201

UNITED STATES PATENT OFFICE 2,518,201

PUFF-FINISHING MACHINE

William I. Tattle, Toronto, Ontario, Canada, assignor, by mesne assignments, to Valcourt, Inc., Boonton, N. J., a corporation of New Jersey Application August 14, 1946, Serial No. 690,578

6 Claims. (Cl. 26—29)

This invention relates to a puff-finishing machine; more particularly it relates to a machine which is designed to trim the peripheral fibers of powder puffs and which may optionally be designed also to brush out the surface fibers of powder puffs.

Powder puffs, which are used for applying cosmetic powders to the skin, are manufactured in enormous quantities and of a considerable variety of materials. They have in general a surface of long fibers in the form of a wool or nap which temporarily retains powder but readily gives it up when patted on the skin. This surface may, for example, be a natural wool surface, or may be the napped surface of a wool, cotton or other fabric. Usually powder puffs are circular in form.

In the manufacture of powder puffs the surface nap fibers are brushed out radially and the ends of the fibers extending beyond the desired periphery are trimmed off so that the puffs will present a finished appearance satisfactory to purchasers. Prior to the present invention these two operations have, as far as I know, been carried out commercially by hand and by the use of male and female cutting dies. These methods have resulted in excessive manufacturing costs and frequently unsatisfactory appearance of the product. The hand-trimming operation particularly has been time-consuming, costly and unsatisfactory.

Accordingly, it is one object of my invention to provide a machine for trimming powder puffs peripherally.

It is another object of my invention to provide a machine of this kind which is largely automatic in operation but relatively simple in construction.

It is a further object of my invention to provide a puff-trimming machine which will also brush out the surfaces of powder puffs automatically.

Other objects and advantages will be apparent from the following description.

My machine comprises, essentially, an intermittently revolving work table provided with a plurality of equiangularly spaced rotatable chucks, each chuck capable of receiving, holding and discharging a powder puff; driving and control mechanism rotates the table and halts it intermittently, so that each chuck in turn is stopped at a work station; the work stations are a loading station, a trimming station and a discharge station, with one or more brushing stations provided, if desired, between the loading and trimming stations; mechanism is provided to rotate the chucks rapidly on their own axes at brushing and trimming stations, and to eject puffs at the discharge station; trimming mechanism, which may be in the form of rotating shears, is provided at the trimming station, and a rotary brush is provided at each brushing station if the machine is designed for brushing.

In operation, as each chuck halts at the loading station, an operator places a puff face up in the chuck. As the chuck is carried by the work table to, for example, the brushing station, it is engaged by gearing which rotates it rapidly on its own axis; at the brushing station the surface of the rotating puff is engaged by a rotating brush—for example a wire brush—, so placed as to brush the surface fibers out radially towards the periphery; a second brushing station may be provided, if desired, to effect more complete brushing. After a momentary halt at each of the one or more brushing stations, the table carries the chuck to the trimming station where it is again rotated at high speed on its own axis; rotating blades, mounted at a suitable distance from the chuck axis and rotating in a plane tangent to the finished puff in its chuck, cooperate with a fixed blade to trim off, by a shear action, fibers extending radially beyond the desired periphery of the finished puff. The rotating blades are preferably made to engage and slide past a fixed blade so that the cutting action is similar to that of ordinary scissors. Finally, after trimming is completed the work table carries the chuck, now disengaged from the spinning gears, to the unloading station, where the puff is ejected upwardly from the chuck by a plunger or other suitable ejecting device.

One embodiment of my invention is illustrated in the following description and drawings, but this embodiment is intended to be illustrative only and not to limit my invention, the scope of which is defined in the appended claims.

In the drawings, which are diagrammatic:

Fig. 1 is a plan view, and Fig. 2 is a side elevation of my machine, both partly in section;

Fig. 3 is a sectional view of a puff chuck and its ejecting plunger; and

Fig. 4 is a section of the receiving tube provided for finished puffs.

The machine is mounted on a base plate 1; an upper plate 2, suitably spaced from plate 1, provides additional bearing support for the arbors of the gearing and other mechanism. The work table 3 is carried on a vertical shaft or arbor 4 journaled in plates 1 and 2. Four puff chucks, 5, are rotatably mounted on the work table, their hollow vertical spindles 6 projecting through bearings in the table. Each spindle carries a toothed pinion 7 fixedly mounted on it below the work table for spinning its associated chuck at the brushing and trimming stations by frictional engagement with rubber-tired friction pulleys 8 and 9.

The work table 3 is intermittently rotated 90° and positively locked between rotations so that each chuck is halted successively at loading station $a$, brushing station $b$, trimming station $c$, and discharge station $d$. Rotation and locking are effected as follows: Shaft 4 of work table carries four fixed equispaced radial arms 10 near its lower end. These arms are successively engaged by rotating drive arm 11 carried by vertical shaft 12 which is journaled in plates 1 and 2 and extends below plate 1 and above plate 2, the action being similar to that of a Geneva motion. Each complete revolution of shaft 12 thus rotates table 3 through 90°. Table 3 has in its periphery four equispaced locking recesses 13 which are engaged successively by locking arm 14 pivoted on plate 2 at 15. A cam 16 near the upper end of shaft 12 lifts arm 14 out of recess 13 periodically just before rotation of work table by arms 11 and 10. Between rotations of table 3, arm 14 is seated in one of the recesses 13 by tension spring 17.

Shaft 12 is rotated by motor 18 through belt 19, suitable grooved pulleys, and worm pinion and gear 20 and 21.

Rubber-tired friction pulleys 8 and 9, mentioned above, are respectively fixedly mounted on vertical shafts 20' and 21' journaled in plate 2. Shaft 20' carries grooved pulley 22 near its lower end and shaft 21' carries grooved pulleys 23 and 24 near its lower end; pulleys 22 and 23 are horizontally alined, and pulley 24 is horizontally alined with grooved pulley 25 carried by shaft 12. A belt 26, passing over idler pulley 27, mounted on plate 2, drives pulley 24 and associated elements from pulley 25. Another belt 28 in turn drives pulley 22 and associated elements from pulley 23.

Brushing is effected by a rotary wire brush 29 with flexible wire bristles mounted directly on the shaft of high-speed motor 30. The latter is suitably mounted (mountings not shown) in such a position that the brush is tangent to the surface of a puff carried by the chuck at the brushing station and the bristles contact the nap but not the base fabric of the puff.

The trimming mechanism is shown at 31. It comprises a fixed blade 32 mounted horizontally so that its upper cutting edge is on a level with the puff carried by chuck 5 at the trimming station c, and so spaced from the chuck that its cutting edge is tangent to the desired periphery of the finished puff. Cooperating with this fixed blade 32 is a rotary blade 33 fixed on and rotating with shaft 34 which also carries drive pulley 35. The latter is driven by motor 18 through belt 36. Rotary blade 33 is so shaped and so positioned with respect to fixed blade 32 as to make spring sliding contact with the latter. Both blades are made of high-speed steel. Shaft 34 is journaled in two bearings 37 mounted on plate 38 to which fixed blade 32 is also attached. Plate 38 is adjustably mounted on brackets (not shown) carried by plate 2 so that the trimming assembly 31 may be moved to and away from work table 3 to accommodate puffs of different size.

Considerable amounts of clippings are produced by the trimming operation. Provision is made for removing these by means of centrifugal exhaust blower 39 driven by motor 18 through belt 40. The clippings are carried to blower 39 by intake duct 41 and exhausted from blower to a collecting bag (not shown) by exhaust duct 42.

After completion of the trimming operation the chuck is moved by table 3 to discharge station d. In the hollow spindle 6 of each chuck is a discharge plunger 42 which ordinarily by its own weight assumes the position shown in Fig. 3. In position d this plunger is brought over push rod 43 which is mounted in plate 2 to permit limited vertical sliding movement. Shaft 12 carries vertically acting discharge plunger cam 44 which is so positioned that while a chuck is momentarily at rest at station d, the cam forces push rod 43 and plunger 42 upwards, thus expelling the puff from chuck 5. After discharge of the puff, table 3 rotates the chuck to loading station a and the cycle is repeated.

To receive the finished expelled puffs I provide a lightweight brass tube 45 positioned immediately above the chuck at station d. The inside diameter of the tube is slightly larger than that of the finished puffs. Tube 45 is provided with two light spring steel retaining fingers 46 riveted to the outside of the tube and having their lower ends 47 bent around the lower edge of the tube and projecting slightly into the tube as shown in Fig. 4. The rise of plunger 42 is sufficient to move the ejected puff above the bent-up ends of the fingers and the flexibility of the fingers is sufficient to permit upward passage of the puffs without disfigurement. The shape and stiffness of the bent-up ends of the fingers is such, however, as to retain a considerable column of ejected puffs in tube 45.

The chuck 5 shown in the drawings is designed to hold a type of puff 48 shown in Fig. 3, having a circular semi-rigid backing piece 49 cemented to the puff fabric 50 on the side opposite the nap 51. The upper surface of the chuck contains a shallow circular recess 52 in the center of which is a deeper recess 53 to receive the head of the discharge plunger 42 in its inactive position as shown in Fig. 3. The rim of recess 52 has a slight tumble-home 54. The smaller inside diameter of the rim is slightly less than that of backing 49. Accordingly, if an inverted puff is pressed on an empty chuck, backing down, the backing is retained in recess 52 in slightly cupped form by its own resilience, the backing edges lying just within and below upper edges of tumble-home 54. The puff is thus held sufficiently firmly in the chuck for brushing and trimming but is readily released by action of the discharge plunger. Other types of chucks may be used to hold puffs of different construction.

One device, which I have found may be adopted if required for holding puffs in the chucks during the trimming operation, but which is not necessary for the puffs just described, is illustrated at 55. It comprises essentially a rigid post 56 mounted on plate 2 to which is pivoted at 57 horizontal arm 58 having rigid downwardly extending vertical extension 59; a tension spring 60 tends to hold down arm 58 against push rod 61 slidably mounted in bracket 62 carried by plate 2; vertically operating cam 63 carried on the upper end of shaft 12 intermittently lowers and raises arm 58 through push rod 61 acting against spring 60, the shape and angular position of the cam being such that arm 58 is lowered as a puff is brought to trimming station c, remains down during trimming and is raised just before the puff is moved to discharge station d; and finally the lower end of extension 59 carries rotatably mounted friction plate 64, preferably mounted on a ball thrust bearing, which plate is adapted to engage and rotate with the puff held by the chuck at station c and clamp it in the chuck during trimming when cam 63 and push rod 61 permit arm 58 to be depressed by spring 60.

For clarity in the drawings and facility in understanding operation of the machine, certain conventional members have been omitted where it appears their location is non-critical and their function obvious.

The operation of the machine is as follows: When rotation of the work table 3 by motor 18, belt 19, worm gears 20 and 21, shaft 12, arm 11, and an arm 10, brings an empty chuck to loading station a, the table is momentarily locked in this position by arm 14, activated by cam 16 falling into recess 13. The operator here presses the backing of an inverted puff into recess 52 of the chuck, where it is held as described above.

Continuously rotating shaft 12 and cam 16 then raise arm 14 from recess 13, the table 3 is rotated 90° by engagement of arm 11 with another arm 10, and the loaded chuck is brought to the brushing station b, at which point table 3 is again locked by arm 14. The pinion 7 on chuck spindle 6 at station b has meanwhile engaged rubber-tired wheel 8 on shaft 28' rotated by pulley 22, belt 28, pulley 23, shaft 21', pulley 24, belt 26 and pulley 25 on continuously rotating shaft 12; this spins the chuck on its axis. At the same time the nap on the surface of the puff is engaged by brush 29 rotated by motor 30 in the direction shown by the arrow in Fig. 2 and thereby the nap fibers are brushed out radially towards the periphery of the puff.

Table 3 is then again rotated 90° and locked in the same way with the chuck carrying the brushed puff occupying trimming station c, where it is spun on its axis by rubber-tired wheel 9 on shaft 21'. At this station rotating blades 33 cooperating with fixed blade 32 trim off excess fibers projecting beyond the desired periphery of the puff and give the puff a smooth circular contour. Trimmings are removed by exhaust blower 39 through 41 and 42.

Finally, on further rotation of table 3 through 90°, the chuck carrying the brushed and trimmed puff is brought to and locked at discharge station d, where action of cam 44, push rod 43 and plunger 42 eject the puff into receiver 45. Thereafter the cycle is repeated. The same operations are performed in sequence on the other three chucks carried by table 3.

I have found it convenient in starting and stopping the machine to mount motor 18 on a base hinged as at 65 so that tension on belts 19, 36 and 40 may be released or increased by swinging the motor upwards or downwards as by pedal or lever 66 pivoted at 67.

As noted above, various modifications of my machine may be made without departing from my invention. For example, clamp 58, 59 and 64 with associated parts may be used or not, the form of chucks may be changed, the brushing unit may be omitted or the number of brushing stations increased, etc., all as called for by the particular circumstances in which the machine is used.

I claim:

1. In a puff-finishing machine, the combination of an intermittently movable chuck-carrying element, a chuck adapted to hold a puff rotatably mounted on said element, means to move said element intermittently thereby bringing said chuck to and positioning it at a plurality of stations, separate spinning and trimming means at one of said stations, said spinning means being adapted to rotate the chuck with respect to the chuck-carrying element while the chuck is positioned at the said station, and said trimming means being adapted to trim off fibers projecting beyond the periphery of a puff held by the chuck while being spun at the said station.

2. In a puff-finishing machine, the combination of a plurality of puff-carrying chucks rotatably mounted on a work table, the work table being adapted to be intermittently rotated to bring each of the chucks successively to and position it at a plurality of fixed stations, means for thus intermittently rotating the work table, separate spinning means and trimming means at one of the fixed stations, the spinning means being adapted to engage and rotate a chuck with respect to the work table while positioned at the said station, and the trimming means being adapted to trim the edges of a puff carried by the spinning chuck.

3. The combination defined in claim 2, in which the trimming means comprises a movable blade cooperating with a fixed blade, the fixed blade having its cutting edge in the plane of a puff held by the spinning chuck and tangent to the desired periphery of the puff and the movable blade moving about an axis parallel to the plane of the puff.

4. The combination defined in claim 2 and in further combination therewith positive locking means adapted to prevent movement of the work table between intermittent rotations.

5. In a puff-finishing machine, the combination of a plurality of puff-carrying chucks rotatably mounted in equiangular spacing near the periphery of a work table, the work table being adapted to be intermittently rotated through a submultiple of a circular arc thereby bringing each chuck successively to and positioning it at a plurality of fixed stations, means for thus intermittently rotating the work table, spinning means at two of the fixed stations adapted to engage the chucks positioned at these stations and rotate them with respect to the work table, at the first of said two fixed stations brushing means adapted to engage the surface of a puff carried by the spinning chuck and brush its fibers out radially toward its periphery, at the second of said two fixed stations trimming means adapted to engage and trim off fibers extending beyond the desired periphery of a puff carried by the spinning chuck, at a subsequent fixed station discharge means adapted to eject a puff from the chuck positioned at that station, and positive locking means adapted to engage and prevent movement of the work table between successive intermittent rotations.

6. The combination defined in claim 5, in which the discharge means and the positive locking means are cam-operated in synchronism with the means for intermittently rotating the work table.

WILLIAM I. TATTLE.

REFERENCES CITED

The following references are of record in the file of this patent:

UNITED STATES PATENTS

| Number | Name | Date |
| --- | --- | --- |
| 764,898 | Mumford | July 12, 1904 |
| 1,389,302 | Hagstrom | Aug. 30, 1921 |
| 1,693,263 | Van Veen | Nov. 27, 1928 |
| 1,796,824 | Brown | Mar. 17, 1931 |